Oct. 25, 1955  F. J. MACHOVEC  2,721,432
POWER LAWN EDGER AND TRIMMER
Filed July 6, 1950  3 Sheets-Sheet 2
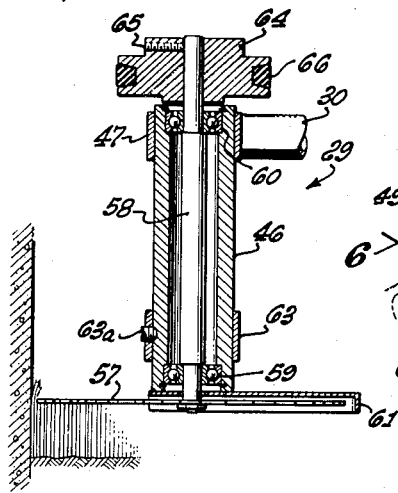
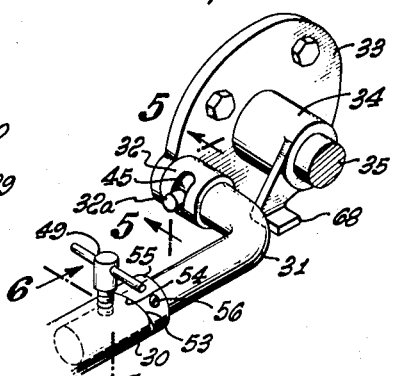
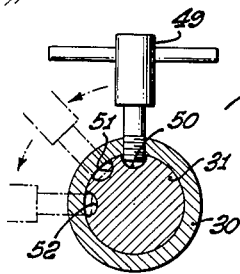
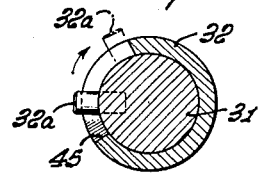
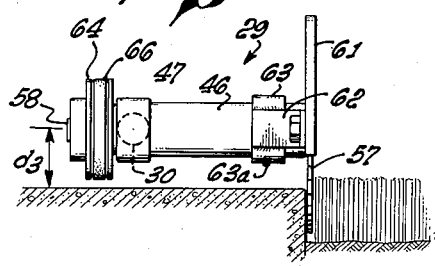
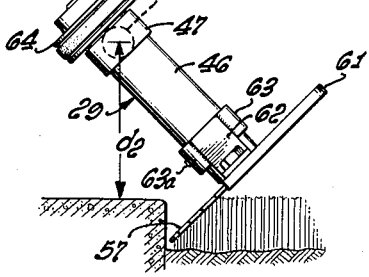
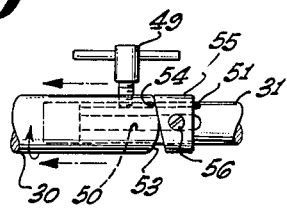
INVENTOR.
FRED J. MACHOVEC,
BY
ATTORNEY.

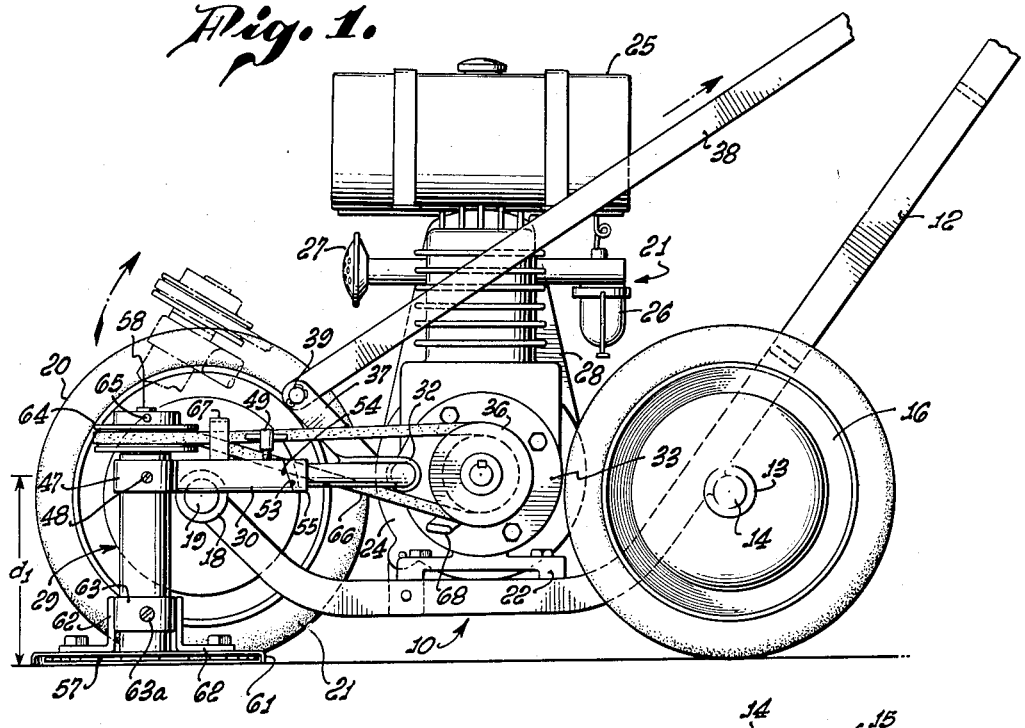

Oct. 25, 1955 — F. J. MACHOVEC — 2,721,432
POWER LAWN EDGER AND TRIMMER
Filed July 6, 1950 — 3 Sheets-Sheet 3

INVENTOR.
FRED J. MACHOVEC,
BY
ATTORNEY.

United States Patent Office 2,721,432
Patented Oct. 25, 1955

2,721,432

POWER LAWN EDGER AND TRIMMER

Fred J. Machovec, Pasadena, Calif.

Application July 6, 1950, Serial No. 172,338

5 Claims. (Cl. 56—25.4)

My invention relates to power-driven gardening tools and is particularly designed for trimming the edge of lawns both along walks or pavement, around the margin of flower beds, or around trees, benches, and the like set into the lawn.

It is well known that the neat trimming of the edges of lawns adds greatly to the attractiveness of a garden or park, but is a job that is burdensome to do effectively. Various tools are in general use for lawn edging, some depending on the exertion of very considerable effort for their effectiveness, while those which are easier to use do not do very satisfactory work.

To the best of my knowledge no power-driven lawn edger has, prior to my invention, been provided which is satisfactory in service and it is the general object of my invention to provide a lawn edger and trimmer mounted on a small wheeled frame carrying a prime mover, such as the usual small gasoline motor or electric motor, which is capable of quickly and thoroughly carrying out the various edging and trimming operations required properly to maintain gardens or parks.

It is an object of my invention to provide a power machine of the kind described having the cutting element so mounted that it may be quickly adjusted to a position to effect a vertical cut at the edge of the lawn, or to make an inclined cut which is sometimes preferred between the edge of the lawn and pavements or walks.

Another object of my invention is to provide a power-operated lawn edger or trimmer in which the cutting element may be adjusted so that it will cut horizontally, that is, parallel to the ground, so that the lawn may be trimmed right up to the trunks of trees set in the grass.

It is another object of my invention to provide a power lawn edger and trimmer in which the cutting element is carried alongside the front wheel of a wheeled tricycle whereby the cutting element can be easily steered around curves of small radius as when trimming around a tree trunk.

It is a further object of my invention to provide a power lawn edger and trimmer in which the cutting element is adjustable to a plurality of angular positions, and to provide a belt drive from the source of power to the cutting element, means being provided automatically to maintain driving and driven belt pulleys at a constant distance notwithstanding the angular changes in position of the cutting element.

A still further object of my invention is to provide a simple but effective machine for the purpose described which will require a minimum of maintenance in a long period of service.

Still further objects and features of my invention will hereinafter appear from the following description read together with the accompanying drawings illustrating an embodiment of the invention at present deemed preferable by me.

In the drawings:

Figure 1 is a side elevation of the power-driven lawn edger and trimmer of my invention, the handle being broken through to shorten the view, and the cutting element being shown in horizontal position;

Figure 2 is a plan view of the machine as shown in Figure 1 but with the means mounted on the handle to adjust the position of an arm carrying the cutter assembly omitted;

Figure 3 is an enlarged section on the line 3—3 of Figure 2 showing the cutting element arranged horizontally;

Figure 4 is an enlarged perspective view of an arm adjustably mounted on a portion of the machine frame and on which the arm cutter assembly is rotatably adjustable, drawn on a larger scale than in Figure 1;

Figure 5 is an enlarged cross-section on the line 5—5 of Figure 4;

Figure 6 is an enlarged cross-section on the line 6—6 of Figure 4;

Figure 7 is a detail view of the cutter assembly angularly arranged to cause the cutting element to trim the edge of a lawn at an angle;

Figure 8 is an elevational view of the cutting element adjusted to cut perpendicularly;

Figure 9 is an enlarged fragmentary view of an automatic adjustment effective to move the cutter assembly axially on the arm on the arm on which it is mounted when turned thereon from one position of the cutting element to another;

Figure 10:
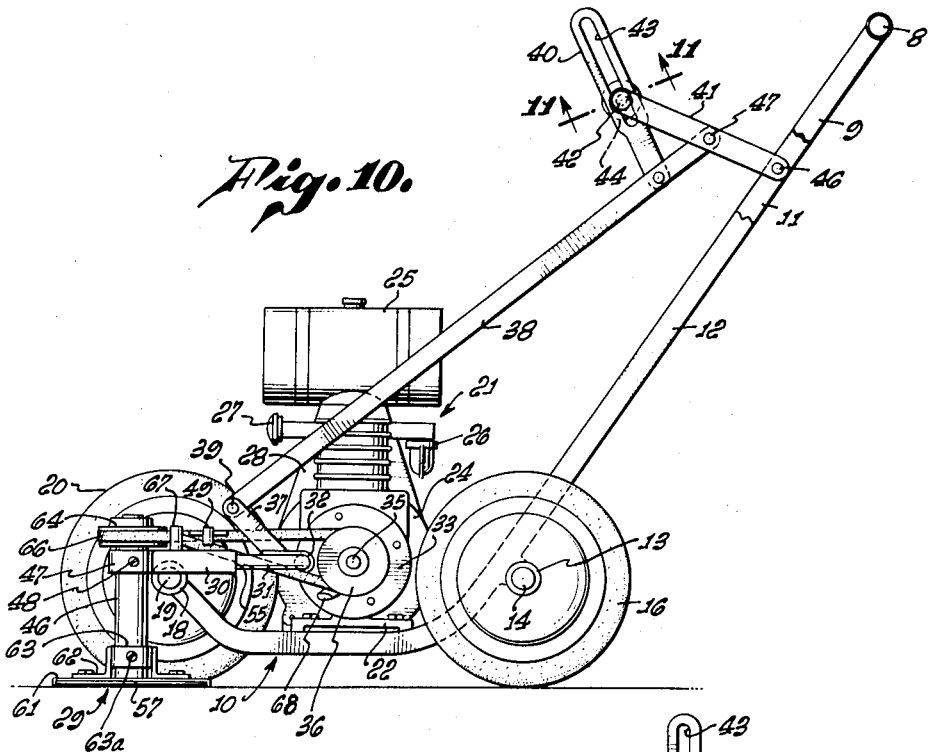
Figure 10 is a side view of the machine similar to Figure 1 but on a smaller scale to show the manual adjusting means for the cutting element mounted on the handle.

In the drawings the numeral 10 indicates a frame comprised of two flat frame members, bars or arms 11 and 12 fixedly secured as by welding at the back of the machine to a rod 13 and continued rearwardly and upwardly to form a handle 9. The rearward extensions of the bars are secured at their ends to a crossbar 8, affording hand holds for the operator. The ends of rod 13 provide axles 14 and a pair of rear wheels 15, 16 are mounted to rotate freely thereon. At their front ends bars 11 and 12 are welded to bearings 17, 18 for the axle 19 of a front wheel 20. Wheels 15, 16, and 20 are preferably equipped with rubber tires as shown.

The frame 10 is dropped or bowed betweeen the front and back wheels and a suitable form of small internal combustion or gasoline motor 21 is there mounted by means of brackets 22 bolted to the frame members 11 and 12 and to the crank case 24 of the engine. Thus a low center of gravity is provided for the machine. The gasoline tank of the motor is indicated at 25, the carburetor at 26, and the exhaust muffler at 27. The usual ignition equipment is carried in the housing 28.

The cutter assembly 29 is mounted by a tube 30 for rotatable and axial movement on an L-shaped arm 31 itself pivotally mounted in a bearing sleeve 32 positioned on one side of a plate 33 bolted to motor crank case 24. When secured in position the motor crank casing 24, plate 33 and sleeve 34, together with the bowed frame portion 10 comprising the two side bars and with the transverse rods 13 and the handle members in effect constitute the fixed frame of the machine, to portions of which fixed frame the movable parts of the machine are suitably connected. Plate 33 is provided centrally with a sleeve 34 affording a bearing for the motor shaft 35 to the outer end of which a belt pulley 36 is keyed.

As will be noted the arm 31 is L-shaped, being provided with an elbow connecting two portions extending at right angles to each other, one portion extending laterally from the side of the machine and being mounted for rotation in the sleeve 32, and the other extending into the tubular member 30. Thus the arm 31 carrying the tube 30 and through it cutter assembly 29 is adjustable in a vertical plane about the horizontal axis of sleeve 32. Such adjustment may be accomplished by means of a rigidly connected arm 37 which projects angularly upward and forwardly from the lateral portion of arm 31 adjacent its elbow. A pull bar 38 is pivoted at one end to arm 37 by a pin 39 and extends upwardly and rearwardly toward the upper end of handle 9. A suitable arrangement is provided for adjustably securing pull bar 38 to the handle and in order to retain the arm 37 and so the cutter assembly 29 in different positions (see Figs. 10 to 12). The means comprise a link 40 slotted at 43 for a major portion of its length and secured at its lower end to the bar 38 near its upper end. A second link 41, also referred to as an operating lever, is pivoted at its lower end to the handle 9 by a pin 46, to the bar 38 near its center by a pin 47, and is adjustably clamped to the slotted portion of link 40 by a stud 42 passing through the link slot 43. An enlarged exteriorly knurled nut 44 seats on the end of stud 42 and upon being tightened thereon enables the end of link 41 to be clamped fixedly to the link 40. A rigid linkage system is then present in which the only possible movement would be about the pivot pins 39 of crank arm 37 or the pivot pin 46 of link 41. As these pivot points are spaced, movement about either is impossible under the circumstances and the crank arm 37, and with it the cutter assembly, is fixed in position.

Figure 11:
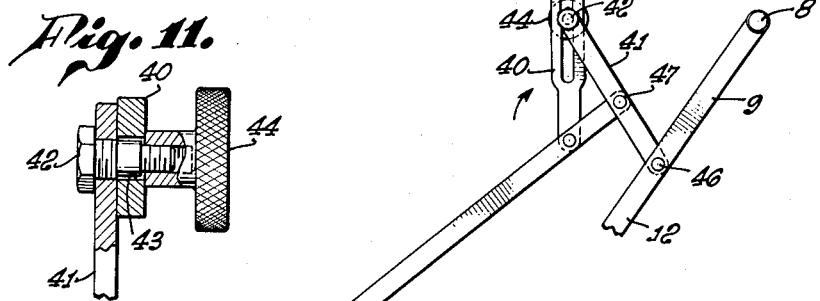
Figure 11 is an enlarged section upon the line 11—11 of Figure 10.
Figure 12:
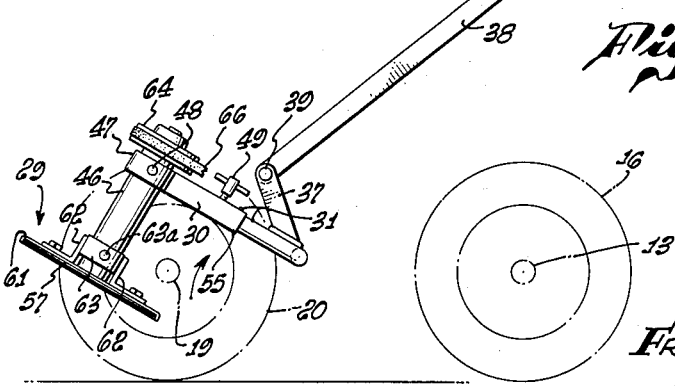
Figure 12 is a view of the adjustment mechanism showing the cutting element raised to inoperative position.

It is to be noted that arm 31 is restricted to a limited pivotal movement in a vertical plane, as is most clearly shown in Figures 4, 10 and 12. Its inner end is bent at right angles and seats, as described, in bearing sleeve 32 and the extent of rotation is limited by a pin 32a which it carries and which projects through an arcuate slot 45 in bearing 32 as shown in Figure 5.

The cutter assembly 29 includes an elongated cutter shaft bearing sleeve or housing 46 seated at the end of tube 30 in a short integral collar 47 in which it is secured by studs 48. Sleeve 30 is rotatable on arm 31 and is held in one of three angular positions by a manually adjustable T bolt 49 engageable selectively in one of the three longitudinally extending grooves 50, 51, 52 in arm 31. When bolt 49 is engaged in recess 50 bearing sleeve 46 is in the vertical position illustrated in Figures 1 and 2; when engaged in recess 52 tube 30 holds bearing sleeve 46 in its horizontal position shown in Figure 8; and when bolt 49 is engaged in recess 51 sleeve 46 is held in an inclined position of about 45 degrees, as illustrated in Figure 7.

In order to move tube 30 axially and automatically so that the effective combined length of arm 31 and tube 30 may change, a result desirable for belt-tensioning purposes as the angularity of sleeve 46 is changed as will appear, the end of the tube 30 is formed with a cam face 53 abutting a cam face 54 at the end of a collar 55 secured to arm 31 by a stud 56 the inner end of which seats in one of the grooves 50, 51 or 52. Collar 55 may be longitudinally shifted on arm 31 by loosening stud 56 in the event it is desired to shift the range of belt-tensioning. That is, if a new belt is incorporated or if an old belt stretches, collar 55 can be axially shifted as required. The automatic belt-tensioning effect described then is based upon this new position of the collar.

As best shown in Fig. 3 the cutting mechanism comprises a saw-toothed disc cutting element 57 is positioned at the lower end of sleeve 46 being mounted on a shaft 58 rotatable in ball bearings 59, 60 carried by the sleeve. Cutting element 57 is protected around a portion of its periphery by a semi-circular overlying guard 61 secured by brackets 62 to a collar 63 rotatably adjustable on sleeve 46 and selectively held in position thereon by a set screw 63a. A belt pulley 64 is fixedly mounted on the opposite or upper end of shaft 58 by a set screw 65 and is connected to motor pulley 36 by a driving V belt 66.

A further reason for providing means to adjust the position of sleeve 46, as previously described, is to maintain constant tension on the belt 66 in all positions of the cutter assembly. Without such an arrangement, and because arm 31 pivots about an axis spaced from the motor axis, the distance between the pulleys would vary with adjustment of the cutter assembly to its various angular positions.

A belt guide 67 in the form of a metal strip, with right angularly bent ends, is welded to tube 30 close to pulley 64 and serves to prevent the belt 66 from displacement from belt pulley 64. A second belt guide 68 in the form of a U-shaped angle piece rigid with sleeve 34 and positioned immediately adjacent motor belt pulley 36 performs a similar function for that pulley.

The driving motor may be started in the usual manner by pulling sharply on a cord wound around the starter pulley 69, shown in Figure 2.

In using the lawn edger and trimmer of my invention to trim the lawn around a tree trunk, for instance, the machine would be set as shown in Figures 1, 2 and 3. The adjusting means are fixed with the bar held by the cooperating links 40 and 41 at its upper end which are themselves retained against relative displacement, as previously described, by the manually rotated nut 44 and stud 42. With bar 38 so positioned arm 37 holds arm 31 horizontally and the cutter assembly will be in its vertical position, reference being had to the axis of sleeve 46 and shaft 58. This vertical relationship is retained by fixing T bolt 49 in its seat 50. So related the tube 30 has the low point of its cam face 53 apposed to the high point of cam face 54 of collar 55 on arm 31. The combined lengths of arm 31 and sleeve 30 are then a minimum and the collar 56 is so positioned on arm 31 as to tension belt 66 properly. The engagement of bolt 49 in the groove 50 in arm 31 prevents relative axial and angular movement of the tube 30 on arm 31. With the cutter assembly so positioned the disc cutter 57 lies in a horizontal plane and the guard 61 will be positioned on sleeve 46, by the rotational adjustment of collar 62 thereon, so that it extends between the cutter and the front wheel 20. The cutter is seen to be adjacent but spaced from the single front wheel and the machine, with the ease characteristic of a tricycle, can be steered around curves of small radius. Grass may be trimmed around small trees, or other objects projecting from the lawn, as easily as around large trees.

To set the machine to edge a lawn adjacent a sidewalk by cutting the inclined side of a small trench of a depth of two inches or so, the disc cutter 57 is placed in the position shown in Figure 7 in which it will be noted that the distance spacing the outer end of tube 30 from the ground, indicated by $d2$, is less than the corresponding distance $d1$ in Figure 1. In other words, the axis of the tube 30 and arm 31 is downwardly inclined with the cutter positioned as in Figure 7. The distance separating the motor pulley 36 from the cutter pulley 64 is less in this case than with tube 30 and arm 31 horizontal, since the pivotal point of arm 31 will now be above a line joining the center line of motor pulley and point of attachment of tube 30 to sleeve 46. The combined length of tube 30 and arm 31 will, accordingly, have to be increased if the distance between the belt pulleys 36 and 64 is to remain the same as before and in order to keep the belt taut. To effect the adjustment the T bolt 49 is displaced from its seat 50 and the tube 30 rotated on arm 31 with the cutter assembly to the angular position shown in Figure 7 and the bolt 49 then secured in its seat 51. As previously explained, the rotation of tube 30 automatically displaces it axially outwardly along arm 31 because the high point of the cam face 53 at its end moves toward the high point of the cam face 54 on the fixed collar 55 on arm 31. The cutter shaft 58 is now inclined downwardly from the axis of sleeve 30 and arm 31 at an angle of about 45 degrees. It is additionally necessary, however, to lower the shaft and cutter to bring the latter into operative position relative to the grass. This is done by loosening the nut 44 and pivoting the lever 40 forwardly. The link 41 also pivots forwardly, the stud 42 sliding downwardly in the slot 43 as the bar 38 moves forwardly. The latter movement pivots the lever 37 downwardly and counterclockwise which movement is transmitted directly to the arm 31 carrying the cutter assembly. With the cutter at the right height nut 44 is again tightened, the stud 42 clamped in slot 43, and the unit is positioned for operation. Before beginning operation, however, the guard 61 must be moved around the cutter 57 to the position shown in Figure 7, an adjustment obtained simply by loosening the set screw 63a and rotating the collar 63 on the sleeve 46.

If it is desired to edge a lawn by cutting vertically into it between the grass and an adjacent cement walk, for example, the procedure above described is followed with the exception that the tube 30 is rotated on its arm 31 until the sleeve 46 extends horizontally and the set screw 49 is in position to engage the groove 52. Additionally, the carrying arm 31 would be pivoted further in a counterclockwise direction as to bring the cutter shaft 58 and its enclosing sleeve nearer to the ground level, the distance d3 being less than the corresponding distance d2 and d1 of Figures 7 and 1, respectively. This adjustment would, of course, be obtained at the handle by changing the relative positions of links 41 and 40 in the manner previously described.

With the cutter assembly adjusted to the desired position in the manner described the user starts the combustion engine. The engine is conventional and may be started in any of the usual well known manners, as for example, by wrapping a cord around the starter pulley 69 and giving it a quick yank. With the motor turning over its power is transmitted to the cutter shaft 58 through the belt 66 and pulleys 36 and 64 and the cutter rotates.

The actual propelling force for the unit is provided by the operator by pushing or pulling upon the crossbar at the upper end of the handle 9. As the wheels 15, 16, and 20 are arranged triangularly the cutter assembly 29 is positioned much nearer the center line of the machine than could otherwise be the case. It is in fact positioned relatively close to the front wheel 20 and so located can approach very closely to vertical objects such as trees, etc., without interference from the supporting wheels. The weight of the machine is largely provided by the motor 21 which is located only a short distance ahead of the axles 14 of the rear wheels 15 and 16 so that the operator by applying a downward force upon the upper ends of the bars 11 and 12 forming the handle can easily pivot the front of the machine upwardly about the axles 14 in order to change the direction of travel of the unit.

When it is desired to propel the unit from place to place with its working parts inoperative it is advantageous to raise the cutter assembly upwardly into a protected position in which it is clear of the ground. Such a position is illustrated in Figure 1 in dotted lines and the movement is accomplished simply by loosening the nut 44, pulling the link 40 rearwardly to effect the rearward and upward longitudinal movement of the bar 38. The movement of the latter is transmitted to the lever 37 and through it to the arm 31 which pivots clockwise, as viewed in Figures 1 and 4, whereupon the cutter assembly moves upwardly.

While the particular apparatus herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:
1. In a power operated lawn edging and trimming machine: triangularly arranged front and rear wheels for supporting the machine for travelling in a selected path; frame and handle structure including a generally horizontal drop frame portion supported between said front and rear wheels and extending fore-aft with respect to the travel path, and a rigidly connected handle extending upwardly and rearwardly from the rear end of said frame member, for propelling and guiding the machine in said path; a prime mover having a casing mounted on said drop frame portion between said front and rear wheels, said frame and handle structure and casing comprising a fixed frame of the machine; a cutter unit including a rotatable disc positioned closely adjacent and at the side of said front wheel; mounting means pivoted to said frame for rotation about a transverse horizontal axis, and including a mounting arm extending forwardly from said axis, said cutter unit being mounted on the forward end of said mounting arm for swinging movement therewith; means permitting tilting movement of the cutter unit relative to the mounting arm; means for effecting vertical swinging adjustment of said mounting arm about said transverse axis whereby to adjust the height of said cutter disc; and a flexible endless drive belt connecting said cutter unit to said prime mover, for transmitting power to said cutter unit, and adjustable belt tensioning means to permit transmission of power in all positions of vertical adjustment of said mounting means and tilted adjustment of said unit relative thereto.

2. A power operated lawn edging and trimming machine comprising spaced front and rear wheeled frame supported units, a rigid frame structure carried by said units and comprising a frame member supported by said units and having a downwardly bowed portion intermediate the units, a motor carried by said downwardly bowed portion having a casing rigidly secured to the frame member, a handle rigid with the downwardly bowed frame member and extending upwardly and rearwardly from the rear supporting unit, an arm pivotally carried by the motor casing and extending forwardly therefrom, a collar at the forward end of the arm, a downwardly extending shaft housing carried by said collar, a cutter shaft rotatably supported within said housing having a disc cutter at one end thereof, belt means for driving the cutter shaft from the motor, means for swinging said pivoted arm to raise or lower the cutter, and belt tensioning means to maintain the driving connection in various adjusted positions of the cutter.

3. A power operated lawn edging and trimming machine having a fixed frame, including a downwardly bowed frame member having front and rear wheeled supporting units, a handle portion rigid with the bowed frame member and extending upwardly and rearwardly therefrom, a motor supported upon the bowed frame member intermediate the front and rear supporting units, a transverse driving shaft, a swinging arm mounted for rotation in a vertical plane about a transverse axis in advance of the axis of the motor drive shaft, a cutter assembly mounted on said arm for swinging movement therewith and including a cutting disc and a driven cutter shaft, an endless belt connecting said motor drive shaft and said driven cutter shaft, and belt tension adjusting means for maintaining a driving connection between the motor and cutter in the varying positions of the cutter assembly.

4. A machine as set forth in claim 3 having means for effecting angular adjustment of the cutter assembly with reference to the axis of the swinging arm.

5. A power operated lawn cutting machine having a fixed frame including a downwardly bowed frame member having front and rear wheeled supporting units, a handle portion rigid with the bowed frame member and extending upwardly and rearwardly therefrom, a motor having a casing mounted on the downwardly bowed frame member intermediate the front and rear wheeled units, an arm pivotally connected to a fixed portion of the machine for swinging movement in a vertical plane and extending generally forwardly from the motor, a cutter assembly carried by the pivoted arm, means accessible from the handle for raising and lowering the arm and cutting assembly carried thereby, and means for locking the arm and cutting assembly in adjusted position.

References Cited in the file of this patent

UNITED STATES PATENTS

| Number | Name | Date |
|---|---|---|
| 231,282 | Cunningham | Aug. 17, 1880 |
| 1,189,519 | Word | July 4, 1916 |
| 2,139,353 | Bruder | Dec. 6, 1938 |
| 2,220,342 | Maga | Nov. 5, 1940 |
| 2,310,152 | Ronning | Feb. 2, 1943 |
| 2,410,196 | Benthall | Oct. 29, 1946 |
| 2,439,607 | Irwin | Apr. 13, 1948 |
| 2,462,314 | Fuqua | Feb. 22, 1949 |
| 2,515,732 | Parry | July 18, 1950 |
| 2,521,033 | Bell | Sept. 5, 1950 |
| 2,525,944 | Ralston | Oct. 17, 1950 |
| 2,538,230 | Boggs | Jan. 16, 1951 |
| 2,618,919 | Hutchens | Nov. 25, 1952 |